US010905122B2

(12) United States Patent
Gewehr et al.

(10) Patent No.: US 10,905,122 B2
(45) Date of Patent: Feb. 2, 2021

(54) USE OF TETRAZOLINONES FOR COMBATING RESISTANT PHYTOPATHOGENIC FUNGI ON CEREALS

(71) Applicant: BASF SE, Ludwigshafen am Rhein (DE)

(72) Inventors: Markus Gewehr, Limburgerhof (DE); Jurith Montag, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/083,898

(22) PCT Filed: Mar. 14, 2017

(86) PCT No.: PCT/EP2017/055946
§ 371 (c)(1),
(2) Date: Sep. 11, 2018

(87) PCT Pub. No.: WO2017/157910
PCT Pub. Date: Sep. 21, 2017

(65) Prior Publication Data

US 2019/0082695 A1 Mar. 21, 2019

(30) Foreign Application Priority Data

Mar. 16, 2016 (EP) .................................... 16160599

(51) Int. Cl.
*A01N 43/713* (2006.01)
*A01N 43/653* (2006.01)

(52) U.S. Cl.
CPC ......... *A01N 43/713* (2013.01); *A01N 43/653* (2013.01)

(58) Field of Classification Search
CPC ............................ A01N 43/713; A01N 43/653
See application file for complete search history.

(56) References Cited

U.S. PATENT DOCUMENTS

| | | | |
|---|---|---|---|
| 2,526,660 | A | 10/1950 | Craig et al. |
| 4,242,121 | A | 12/1980 | Hawkins et al. |
| 4,599,362 | A | 7/1986 | Nakatani et al. |
| 4,940,720 | A | 7/1990 | Nevill et al. |
| 4,940,721 | A | 7/1990 | Nevill et al. |
| 4,945,100 | A | 7/1990 | Nyfeler et al. |
| 4,992,458 | A | 2/1991 | Riebli et al. |
| 5,143,932 | A | 9/1992 | Jautelat et al. |
| 5,162,358 | A | 11/1992 | Jautelat et al. |
| 5,215,747 | A | 6/1993 | Hairston et al. |
| 5,378,460 | A | 1/1995 | Zuckerman et al. |
| 5,501,852 | A | 3/1996 | Meadows et al. |
| 5,631,276 | A | 5/1997 | Kern |
| 5,747,025 | A | 5/1998 | Meadows et al. |
| 5,885,598 | A | 3/1999 | Knauf et al. |
| 6,060,051 | A | 5/2000 | Heins et al. |
| 6,871,446 | B1 | 3/2005 | Yamashita |
| 7,183,299 | B2 | 2/2007 | Kobori et al. |
| 7,714,140 | B2 | 5/2010 | Nagata et al. |
| 8,318,636 | B2 | 11/2012 | Bais et al. |
| 8,445,255 | B2 | 5/2013 | Kloepper et al. |
| 8,609,667 | B2 | 12/2013 | Liu et al. |
| 8,772,200 | B2 | 7/2014 | Shibayama et al. |
| 8,865,759 | B2 | 10/2014 | Seitz et al. |
| 9,078,447 | B2 | 7/2015 | Schoefl et al. |
| 9,655,364 | B2 | 5/2017 | Matsuzaki |
| 9,708,341 | B2 | 7/2017 | Wakamatsu et al. |
| 9,725,423 | B2 | 8/2017 | Hasegawa et al. |
| 9,781,931 | B2 | 10/2017 | Matsuzaki |
| 9,781,932 | B2 | 10/2017 | Matsuzaki |
| 9,789,131 | B1 | 10/2017 | Korinek et al. |
| 2002/0152503 | A1 | 10/2002 | King et al. |
| 2003/0068303 | A1 | 4/2003 | Selvig et al. |
| 2003/0203131 | A1 | 10/2003 | Lemay |
| 2003/0224936 | A1 | 12/2003 | Kretzschmar |
| 2007/0244073 | A1 | 10/2007 | Angst et al. |
| 2008/0108686 | A1 | 5/2008 | Gewehr et al. |
| 2009/0036509 | A1 | 2/2009 | Gewehr et al. |
| 2009/0286768 | A1 | 11/2009 | Crew et al. |
| 2010/0209410 | A1 | 8/2010 | Schoefl et al. |
| 2010/0240619 | A1 | 9/2010 | Gregory et al. |
| 2010/0260735 | A1 | 10/2010 | Bais et al. |
| 2011/0212835 | A1 | 9/2011 | Bais et al. |
| 2012/0076765 | A1 | 3/2012 | Schisler et al. |
| 2012/0094834 | A1 | 4/2012 | Frank et al. |
| 2012/0149571 | A1 | 6/2012 | Kloepper et al. |
| 2013/0137658 | A1 | 5/2013 | Matsuzaki |
| 2014/0005047 | A1 | 1/2014 | Hungenberg et al. |
| 2014/0012855 | A1 | 1/2014 | Firat et al. |
| 2014/0112899 | A1 | 4/2014 | Jeschke et al. |
| 2014/0127322 | A1 | 5/2014 | Oberholzer et al. |
| 2014/0323305 | A1 | 10/2014 | Rheinheimer |
| 2015/0051171 | A1 | 2/2015 | Yoshimoto et al. |
| 2015/0250173 | A1 | 9/2015 | Körber et al. |
| 2015/0299146 | A1 | 10/2015 | Hasegawa et al. |
| 2016/0278384 | A1 | 9/2016 | Jabs et al. |

FOREIGN PATENT DOCUMENTS

| | | | |
|---|---|---|---|
| AU | 611315 | B2 | 6/1991 |
| AU | 2013326645 | A1 | 4/2014 |
| CA | 1086734 | A | 9/1980 |
| CA | 1100976 | A | 5/1981 |
| CA | 1187084 | A | 5/1985 |
| CA | 1209152 | A | 8/1986 |
| CA | 1210404 | A | 8/1986 |
| CL | 2012002419 | A1 | 7/2014 |
| CL | 2015002622 | A1 | 4/2016 |
| CN | 1086664 | A | 5/1994 |

(Continued)

OTHER PUBLICATIONS

Kianianmomeni et al., Validation of a Real-Time PCR for the Quantitative Estimation of a G143A Mutation in the Cytochromebc1 Gene of Pyrenophora teres, Pest Management Science, vol. 63, No. 3, (2007), pp. 219-224.

(Continued)

*Primary Examiner* — Robert S Cabral
(74) *Attorney, Agent, or Firm* — Marshall, Gerstein & Borun LLP

(57) ABSTRACT

The present invention relates to the use of use of tetrazolinones optionally in combination with further pesticides for combating resistant phytopathogenic fungi on cereals.

19 Claims, No Drawings

(56) References Cited

FOREIGN PATENT DOCUMENTS

| | | | |
|---|---|---|---|
| CN | 1335854 | A | 2/2002 |
| CN | 1456054 | A | 11/2003 |
| CN | 1475560 | A | 2/2004 |
| CN | 1907024 | A | 2/2007 |
| CN | 101028009 | A | 9/2007 |
| CN | 101225074 | A | 7/2008 |
| CN | 101697736 | A | 4/2010 |
| CN | 101697737 | A | 4/2010 |
| CN | 101917856 | A | 12/2010 |
| CS | 247200 | B2 | 12/1986 |
| DE | 2325878 | A1 | 12/1974 |
| DE | 3801233 | A1 | 8/1988 |
| DE | 3733755 | A1 | 4/1989 |
| DE | 4003180 | A1 | 8/1991 |
| DE | 102009009240 | A1 | 8/2010 |
| EP | 0000017 | B1 | 9/1981 |
| EP | 0077479 | A2 | 4/1983 |
| EP | 0114567 | B1 | 9/1988 |
| EP | 0113640 | B1 | 5/1990 |
| EP | 0275955 | B1 | 7/1990 |
| EP | 0126430 | B1 | 8/1991 |
| EP | 0470466 | A2 | 2/1992 |
| EP | 354183 | B1 | 1/1993 |
| EP | 0440950 | B1 | 11/1993 |
| EP | 1700919 | A1 | 9/2006 |
| EP | 1431275 | B1 | 4/2010 |
| EP | 2649879 | A1 | 10/2013 |
| EP | 1469122 | B1 | 2/2014 |
| EP | 2815649 | A1 | 12/2014 |
| EP | 2835052 | A1 | 2/2015 |
| EP | 2865265 | A1 | 4/2015 |
| EP | 2910126 | A1 | 8/2015 |
| EP | 2962568 | A1 | 1/2016 |
| FR | 2491924 | A1 | 4/1982 |
| GB | 2064520 | A1 | 6/1981 |
| GB | 2132195 | A1 | 7/1984 |
| GB | 2143815 | A1 | 2/1985 |
| GB | 2481118 | A | 12/2011 |
| JP | 59-222434 | A | 12/1984 |
| JP | 2-83304 | A | 3/1990 |
| NZ | 230176 | A | 1/1992 |
| RU | 2478290 | C2 | 4/2013 |
| WO | 9401546 | A1 | 1/1994 |
| WO | 9410846 | A1 | 5/1994 |
| WO | 9619112 | A1 | 6/1996 |
| WO | 96041804 | A1 | 12/1996 |
| WO | 00029426 | A1 | 5/2000 |
| WO | 02060250 | A2 | 8/2002 |
| WO | 02085891 | A1 | 10/2002 |
| WO | 02091824 | A2 | 11/2002 |
| WO | 03016303 | A1 | 2/2003 |
| WO | 03064572 | A1 | 8/2003 |
| WO | 05123689 | A1 | 12/2005 |
| WO | 05123690 | A1 | 12/2005 |
| WO | 06015866 | A1 | 2/2006 |
| WO | 06016708 | A1 | 2/2006 |
| WO | 06037632 | A1 | 4/2006 |
| WO | 06087373 | A1 | 8/2006 |
| WO | 06109933 | A1 | 10/2006 |
| WO | 06119876 | A1 | 11/2006 |
| WO | 07031308 | A2 | 3/2007 |
| WO | 07072999 | A1 | 6/2007 |
| WO | 07129454 | A1 | 11/2007 |
| WO | 08013622 | A2 | 1/2008 |
| WO | 08082198 | A1 | 7/2008 |
| WO | 09037242 | A2 | 3/2009 |
| WO | 09090181 | A2 | 7/2009 |
| WO | 09094442 | A2 | 7/2009 |
| WO | 10043319 | A1 | 4/2010 |
| WO | 10109436 | A1 | 9/2010 |
| WO | 10128003 | A2 | 11/2010 |
| WO | 10139271 | A1 | 12/2010 |
| WO | 10139656 | A2 | 12/2010 |
| WO | 10146114 | A1 | 12/2010 |
| WO | 11081174 | A1 | 7/2011 |
| WO | 11099804 | A2 | 8/2011 |
| WO | 11109395 | A2 | 9/2011 |
| WO | 11114280 | A2 | 9/2011 |
| WO | 11117272 | A2 | 9/2011 |
| WO | 11147953 | A1 | 12/2011 |
| WO | 11154494 | A2 | 12/2011 |
| WO | 11162397 | A1 | 12/2011 |
| WO | 12020772 | A1 | 2/2012 |
| WO | 12023143 | A1 | 2/2012 |
| WO | 12037782 | A1 | 3/2012 |
| WO | 12047608 | A2 | 4/2012 |
| WO | 12072696 | A1 | 6/2012 |
| WO | 12076563 | A1 | 6/2012 |
| WO | 12079073 | A1 | 6/2012 |
| WO | 12080415 | A1 | 6/2012 |
| WO | 12163945 | A1 | 12/2012 |
| WO | 13007767 | A1 | 1/2013 |
| WO | 13010862 | A1 | 1/2013 |
| WO | 13010885 | A1 | 1/2013 |
| WO | 13010894 | A1 | 1/2013 |
| WO | 13024075 | A1 | 2/2013 |
| WO | 13024076 | A1 | 2/2013 |
| WO | 13024077 | A1 | 2/2013 |
| WO | 13024080 | A1 | 2/2013 |
| WO | 13024081 | A1 | 2/2013 |
| WO | 13024082 | A1 | 2/2013 |
| WO | 13050302 | A1 | 4/2013 |
| WO | 13092224 | A1 | 6/2013 |
| WO | 13116251 | A2 | 8/2013 |
| WO | 13162072 | A1 | 10/2013 |
| WO | 13162077 | A1 | 10/2013 |
| WO | 13162716 | A2 | 10/2013 |
| WO | 14007663 | A1 | 1/2014 |
| WO | 14013223 | A1 | 1/2014 |
| WO | 14029697 | A1 | 2/2014 |
| WO | 14051161 | A1 | 4/2014 |
| WO | 14053398 | A1 | 4/2014 |
| WO | 14060177 | A1 | 4/2014 |
| WO | WO14051165 | A1 | 4/2014 |
| WO | 14076663 | A1 | 5/2014 |
| WO | 14079719 | A1 | 5/2014 |
| WO | 14079724 | A1 | 5/2014 |
| WO | 14079728 | A1 | 5/2014 |
| WO | 14079730 | A1 | 5/2014 |
| WO | 14079752 | A1 | 5/2014 |
| WO | 14079754 | A1 | 5/2014 |
| WO | 14079764 | A1 | 5/2014 |
| WO | 14079766 | A1 | 5/2014 |
| WO | 14079769 | A1 | 5/2014 |
| WO | 14079770 | A1 | 5/2014 |
| WO | 14079771 | A1 | 5/2014 |
| WO | 14079772 | A1 | 5/2014 |
| WO | 14079773 | A1 | 5/2014 |
| WO | 14079774 | A1 | 5/2014 |
| WO | 14079804 | A1 | 5/2014 |
| WO | 14079813 | A1 | 5/2014 |
| WO | 14079814 | A1 | 5/2014 |
| WO | 14079841 | A1 | 5/2014 |
| WO | 14084223 | A1 | 6/2014 |
| WO | 14086848 | A1 | 6/2014 |
| WO | 14086850 | A1 | 6/2014 |
| WO | 14086851 | A1 | 6/2014 |
| WO | 14086853 | A1 | 6/2014 |
| WO | 14086854 | A1 | 6/2014 |
| WO | 14086856 | A1 | 6/2014 |
| WO | 14095932 | A1 | 6/2014 |
| WO | 14095994 | A1 | 6/2014 |
| WO | 14147528 | A1 | 9/2014 |
| WO | 14147534 | A1 | 9/2014 |
| WO | 14191271 | A1 | 12/2014 |
| WO | 14202421 | A1 | 12/2014 |
| WO | 15003908 | A1 | 1/2015 |
| WO | WO15012243 | A1 | 1/2015 |
| WO | WO15012244 | A1 | 1/2015 |
| WO | WO15012245 | A1 | 1/2015 |
| WO | 15038503 | A1 | 3/2015 |
| WO | WO15051171 | A1 | 4/2015 |
| WO | 15113860 | A1 | 8/2015 |

(56) References Cited

FOREIGN PATENT DOCUMENTS

| | | | |
|---|---|---|---|
| WO | 15135701 | A1 | 9/2015 |
| WO | 15141867 | A1 | 9/2015 |
| WO | 15169711 | A1 | 11/2015 |
| WO | 15177021 | A1 | 11/2015 |
| WO | 15180983 | A1 | 12/2015 |
| WO | 15180985 | A1 | 12/2015 |
| WO | 15180987 | A1 | 12/2015 |
| WO | 15180999 | A1 | 12/2015 |
| WO | 15181008 | A1 | 12/2015 |
| WO | 15181009 | A1 | 12/2015 |
| WO | 15190316 | A1 | 12/2015 |
| WO | 15197393 | A1 | 12/2015 |
| WO | WO15181035 | A1 | 12/2015 |
| WO | WO16008740 | A1 | 1/2016 |
| WO | 16071164 | A1 | 5/2016 |
| WO | 16071167 | A1 | 5/2016 |
| WO | 16071168 | A1 | 5/2016 |
| WO | 16071246 | A1 | 5/2016 |
| WO | 16078995 | A1 | 5/2016 |
| WO | WO16071164 | A1 | 5/2016 |
| WO | WO16071167 | A1 | 5/2016 |
| WO | WO16071168 | A1 | 5/2016 |
| WO | WO16071246 | A1 | 5/2016 |
| WO | WO16078995 | A1 | 5/2016 |
| WO | 16091675 | A1 | 6/2016 |
| WO | WO16091675 | A1 | 6/2016 |
| WO | 16174042 | A1 | 11/2016 |
| WO | WO16174042 | A1 | 11/2016 |
| WO | 17144231 | A1 | 8/2017 |
| WO | WO17144231 | A1 | 8/2017 |
| WO | 17157916 | A1 | 9/2017 |
| WO | 17157920 | A1 | 9/2017 |
| WO | 17157923 | A1 | 9/2017 |
| WO | WO17153200 | A1 | 9/2017 |
| WO | WO17157915 | A1 | 9/2017 |

OTHER PUBLICATIONS

International Preliminary Report on Patentability, issued in PCT/EP2017/055946, dated Sep. 18, 2018.

International Search Report, issued in PCT/EP2017/055946, dated Apr. 6, 2017.

Office Action, issued in co-pending U.S. Appl. No. 15/524,064, dated Apr. 2, 2019.

Yu et al., "Synthesis and Fungicidal Evaluation of 2-arylphenyl ether-3-(1H-1,2,4-triazol-1-yl)propan-2-ol Derivatives," Journal of Agricultural and Food Chemistry, vol. 57, No. 11, (2009), pp. 4854-4860.

Zhang, "Evaluation of Microbial Products for Management of Powdery Mildew on Summer Squash and Cantaloupe in Florida," Plant Disease, (2011), pp. 461-468.

Zhou, X. G., et al., "Field evaluation of a beneficial Bacillus strain for biocontrol of sheath blight in rice", Phytopathology, 2011, vol. 101, S204.

Zitter et al., "Control of Early Blight of Tomato with Genetic Resistance and Conventional and Biological Sprays," Proc. 1st IS on Tomato Diseases, Acta Hort, vol. 695, (2005), pp. 181-190.

Office Action, issued in co-pending U.S. Appl. No. 16/084,446, dated Aug. 1, 2019.

Jeanmart, et al., "Synthetic Approaches to the 2010-2014 New Agrochemicals", Bioorganic & Medicinal Chemistry, vol. 24, Issue 3, 2016, pp. 317-341.

"Broadband," (Aug. 9, 2012), retrieved from Internet Jan. 29, 2014, url: http://beckerunderwood.com/media/products/resources/brouadband_instructions_B4D27D46613D6.pdf.

Afon'Kin, A.A. et al. "Synthesis of Some Electron-Rich Aryl(he taryl)oxarines under Phase-Transfer and Homogenous Conditions," Russian Journal of Organic Chemistry, 2008, p. 1776-1779, vol. 44, No. 12.

Akama, Tsutomu, et al. "Discovery and structure-activity study of a novel benzoxaborole anti-inflammatory agent (AN2728) for the potential topical treatment of psoriasis and atopic dermatitis," Bioorganic & Medicinal Chemistry Letters, 2009, p. 2129-2132, vol. 19.

Bartlett, D.W., "The strobilurin fungicides", Pest Management Science, 2002, pp. 649-662, vol. 58.

Bennett et al., "Survival of the Biocontrol Agents Coniothyrium minitans and Bacillus subtilis MBI 600 Introduced into Pasturised, Sterilised and Non-Sterile Soils," Soil Biology & Biochemistry, vol. 35, (2003), pp. 1565-1573.

Brandes, Bridget D., et al., "Synthesis of enantiopure 3-chlorostyrene oxide via an asymmetric epoxidation-hydrolytic kinetic resolution sequence," Tetrahedron; Asymmetry, 1997, p. 3927-3933, vol. 8, No. 23.

Echeveeri-Molina et al., "Toxicity of Synthetic and Biological Insecticides against Adults of the Eucalyptus Snout-Beetle *Gonipterus scutellatus* Gyllenhal (Coleoptera: Curculionidae)," Journal of Pest Science, vol. 83, (2010), pp. 97-305.

Enebak, S.A, et al., "Evidence for Induced Systemic Protection to Fusiform Rust in Loblolly Pine by Plant Growth-Promoting Rhizobacteria", The American Phytopathological Society, Plant Disease/March 2000, vol. 84, No. 3, pp. 306-308.

Facts on Friday Bulletin, Cooton Seed Distributions Extension and Development Team, Jul. 23, 2010 (one page).

Farenhorst, Marit, et al., "Synergy in Efficacy of Fungal Entomopathogens and Permethrin against West African Insecticide-Resistant Anopheles gambiae Mosquitoes", PloS One, Aug. 2010, vol. 5, Issue 8, 10p.

Final Office Action, issued in co-pending U.S. Appl. No. 14/443,844, dated Jun. 23, 2017.

Final Office Action, issued in co-pending U.S. Appl. No. 14/443,206, dated Dec. 12, 2017.

Final Office Action, issued in co-pending U.S. Appl. No. 14/443,844, dated Jul. 11, 2018.

Final Office Action, issued in co-pending U.S. Appl. No. 14/777,845, dated Nov. 22, 2017.

Final Office Action, issued in co-pending U.S. Appl. No. 14/777,850, dated Mar. 30, 2018.

Final Office Action, issued in co-pending U.S. Appl. No. 14/777,845, dated Nov. 13, 2018.

Final Office Action, issued in co-pending U.S. Appl. No. 15/313,229, dated Jun. 14, 2018.

Final Office Action, issued in co-pending U.S. Appl. No. 14/443,206, dated Mar. 4, 2019.

Forrester, Julie, et al. "Generation of trimethylsulfonium cation from dimethyl sulfoxide and dimethyl sulfate: implication s for the synthesis of epoxides from aldehydes and ketones," J. Chem. Soc. Perkin Trans. 1, 1995, pp. 2289-2291, vol. 1995.

Koch et al., "64. Biosynthesis of cis-Jasmone: A Pathway for the Inactivation and the Disposal of the Plant Stress Hormone Jasmonic Acid to the Gas Phase?" Helvetica Chimica Acta, vol. 80, (1997), pp. 838-850.

Kuzenkov, A.V., "Synthesis of substituted 2-azoloyl-1-pyridylethan-1-ols," Chemistry of hererocyclic compounds, 2003, p. 1492-1495 vol. 39, No. 11.

Leisso et al., "The Influence of Biological and Fungicidal Seed Treatments on Chickpea (*Cicer arietinum*) Damping Off," Can J Plant Pathol., vol. 31, (2009), pp. 38-46.

Lima, Lidia Moreira et al., "Bioisosterism: A useful strategy for molecular Modification and drug design," Current Medicinal Chemistry, 2005, p. 23-49, vol. 12.

McKnight and Rossall, "Root Colonization of Cotton Seedlings by Bacillus subtilis MBI 600," 2nd International Workshop on Plant Growth-Promoting Rhizobacteria, (1991), pp. 365-369.

Mosset, Paul et al. "Trimethylsulfonium Methylsulfate, a simple and efficient epoxidizing agent," Synthetic Communications, 1985, p. 749-757, vol. 15, No. 8.

Office Action dated Apr. 3, 2017 for co-pending U.S. Appl. No. 14/777,845.

Office Action dated Feb. 6, 2018 for co-pending U.S. Appl. No. 15/313,229.

(56) References Cited

OTHER PUBLICATIONS

Office Action dated Jun. 23, 2017, from U.S. Appl. No. 14/443,844, filed May 19, 2015.
Office Action, issued in co-pending U.S. Appl. No. 14/443,206, dated Apr. 5, 2017.
Office Action, issued in co-pending U.S. Appl. No. 14/443,206, dated May 25, 2018.
Office Action, issued in co-pending U.S. Appl. No. 14/443,520, dated Oct. 14, 2016.
Office Action, issued in co-pending U.S. Appl. No. 14/443,523, dated Sep. 19, 2016.
Office Action, issued in co-pending U.S. Appl. No. 14/443,844, dated Feb. 14, 2017.
Office Action, issued in co-pending U.S. Appl. No. 14/777,845, dated Nov. 22, 2017.
Office Action, issued in co-pending U.S. Appl. No. 14/777,845, dated Apr. 3, 2017.
Office Action, issued in co-pending U.S. Appl. No. 14/777,845, dated May 29, 2018.
Office Action, issued in co-pending U.S. Appl. No. 14/777,850, dated Mar. 24, 2017.
Office Action, issued in co-pending U.S. Appl. No. 14/777,850, dated Oct. 1, 2018.
Office Action, issued in corresponding CL Application No. 15/8002684, dated Mar. 27, 2017.
Office Action, issued in corresponding CN Application No. 201380071087.5, dated Apr. 26, 2017.
Office Action, issued in corresponding CN Application No. 201480016731.3, dated Apr. 28, 2017.
Office Action, issued in corresponding UA Application No. 1506049, dated Feb. 14, 2017.
Schisler et al., "Formulation of *Bacillus* spp. for Biological Control of Plant Diseases," Journal of Phytopathology, vol. 94, (2004), pp. 1267-1271.
Schmidt et al., "Influence of Soil Temperature and Matric Potential on Sugar Beet Seedling Colonization and Suppression of Pythium Damping-Off by the Antagonistic Bacteria Pseudomonas fluorescens and Bacillus subtilis," Phytopathology, vol. 94, No. 4, (2004), pp. 351-363.
Singh et al., "DuPont CyazypyrTM (DPX-HGW86, cyantraniliprole): A Cross-Spectrum Insecticide for Control of Major Pests of Rice," Abstract of Conference Paper, Entomological Society of America Annual, (2011), retrieved from the Internet on Feb. 9, 2017: https://www.researchgate.net/publication/267528306_DuPont_Cyazypyr_DPX-HGW86_c.
Stamina Supplemental label, BASF Corp, Research Triangle Park, NC, 2011, pp. 1-3.
Wang, "Research Progress and Prospect of Bacillus Subtilis," Journal of the Graduates, Sun Yat-Sen University (Natural Sciences, Medicine), 2012, vol. 33, Issue 3, pp. 14-22.
Wright et al., "Application of Beneficial Microorganisms to Seeds During Drum Priming," Biocontrol Science and Technology, (2003), pp. 599-614.
Fraaije, et al., "Role of Ascospores in Further Spread of QoI-Resistant Cytochrome b Alleles (G143A) in Field Populations of Mycosphaerella graminicola", Phytopathology, vol. 95, Issue 8, Aug. 2005, pp. 933-941.
John Lucas, "Resistance to QoI fungicides: implications for cereal disease management in Europe", Pesticide Outlook, vol. 14, Issue 6, 2003, pp. 268-270.
Pasche, et al., "Prevalence, competitive fitness and impact of the F129L mutation in Altemaria solani from the United States", Crop Protection, vol. 27, Issues 3-5, Mar.-May 2008, pp. 427-435.
Semar, et al., "Field efficacy of pyraclostrobin against populations of Pyrenophora teres containing the F129L mutation in the cytochrome b gene", Journal of Plant Diseases and Protection, vol. 114, Issue 3, Jun. 2007, pp. 117-119.
Sierotzki, et al., "Cytochrome b gene sequence and structure of Pyrenophora teres and P. triticirepentis and implications for QoI resistance", Pest Management Science, vol. 63, Issue 3, Mar. 2007, pp. 225-233.
Sierotzki, et al., "Mode of resistance to respiration inhibitors at the cytochrome bc1 enzyme complex of Mycosphaerella fijiensis field isolates", Pest Management Science, vol. 56, Issue 10, 2000, pp. 833-841.
Tedford et al., Fundamental Aspects for the Development of Resistance to Fungicides, (2007), [online] retrieved from: https://www.plantmanagementnetwork.org/infocenter/topic/soybeanrust/2007/presentations/Tedford.pdf [retrieved Oct. 8, 2018].
Rallos, Characterizing Resistance of the Grapevine Powdery Mildew Erysiphe necator to Fungicides Belonging to Quinone Outside Inhibitors and Demethylation Inhibitors, (2012) [online] retrieved from: https://vtechworks.lib.vt.edu/bitstream/handle/10919/49594/Rallos_LE-D-2013.pdf?sequence=1 [retrieved Oct. 8, 2018].
Dehne et al., Modern Fungicides and Antifungal Compounds V, Proceedings of the 15th International Reinhardsbrunn Symposium on Modem Fungicides and Antifungal Compounds, (2007), [online] retrieved.
Frac Fungicide Resistance Action Committee: List of Pathogens with Field Resistance towards QoI Fungicides, (2012) [online] retrieved from: http://www.frac.info/docs/default-source/qoi-wg/qoi-quick-references/species-with-qo-resistance-%28updated-2012%29.pdf?sfvrsn=4 [retrieved Oct. 8, 2018].
Soares et al., "More Cercospora Species Infect Soybeans Across the Americas than Meets the Eye," Plos One, vol. 10, No. 8, (2015), p. e0133495.
Kataoka et al., "Mechanism of Action and Selectivity of a Novel Fungicide, Pyribencarb," Journal of Pesticide Science, vol. 35, No. 2, (2010), pp. 99-106.
Kuck et al., "Chapter 12. FRAC Mode of Action Classification and Resistance Risk of Fungicides," Modem Crop Protection Compounds, (2007), pp. 415-432.
Standish, et al., "Occurrence of QoI Fungicide Resistance in Cercospora sojina from Mississippi Soybean", Plant Disease, bol. 99, Issue 10, Oct. 2015, pp. 1347-1352.
Zeng, et al., "Characterization of Quinone Outside Inhibitor Fungicide Resistance in Cercospora sojina and Development of Diagnostic Tools for its Identification", Plant Disease, vol. 99, Issue 4, 2015, pp. 544-550.
Final Office Action, issued in co-pending U.S. Appl. No. 14/777,850, dated Apr. 15, 2019.

USE OF TETRAZOLINONES FOR COMBATING RESISTANT PHYTOPATHOGENIC FUNGI ON CEREALS

This application is a National Stage application of International Application No. PCT/EP2017/055946, filed Mar. 14, 2017. This application also claims priority under 35 U.S.C. § 119 to European Patent Application No. 16160599.3, filed Mar. 16, 2016.

The present invention relates to the use of use of a 1-[2-[[1-(4-chlorophenyl)pyrazol-3-yl]oxymethyl]-3-methyl-phenyl]-4-methyl-tetrazol-5-one (herein also referred to as compound I) for combating phytopathogenic fungi on cereals, such fungi containing a mutation in the mitochondrial cytochrome b gene conferring resistance to Qo inhibitors, wherein the mutation is G143A or F129L.

Qo inhibitor fungicides, often referred to as strobilurin-type fungicides (Sauter 2007: Chapter 13.2. Strobilurins and other complex III inhibitors. In: Krämer, W.; Schirmer, U. (Ed.)—Modern Crop Protection Compounds. Volume 2. Wiley-VCH Verlag 457-495), are conventionally used to control a number of fungal pathogens in crops. Qo inhibitors typically work by inhibiting respiration by binding to a ubihydroquinone oxidation center of a cytochrome $bc_1$ complex (electron transport complex III) in mitochondria. Said oxidation center is located on the outer side of the inner mitochrondrial membrane. A prime example of the use of Qo inhibitors includes the use of, for example, strobilurins on wheat for the control of *Septoria tritici* (also known as *Mycosphaerella graminicola*), which is the cause of wheat leaf blotch. Unfortunately, widespread use of such Qo inhibitors has resulted in the selection of mutant pathogens which are resistant to such Qo inhibitors (Gisi et al., Pest Manag Sci 56, 833-841, (2000). Resistance to Qo inhibitors has been detected in several phytopathogenic fungi. In some pathogens, the major part of resistance to Qo inhibitors in agricultural uses has been attributed to pathogens containing a single amino acid residue substitution G143A in the cytochrome b gene for their cytochrome $bc_1$ complex, the target protein of Qo inhibitors (see, for example Lucas, Pestic Outlook 14(6), 268-70 (2003); and Fraaije et al., Phytopathol 95(8), 933-41 (2005), (which both are expressly incorporated by reference herein), whereas in other pathogens a substitution of F129L confers resistant to Qo inhibitors (see for example Sierotzki et al., PEST MANAGEMENT SCIENCE 63(3), 225-233 (2007); Semar et al., JOURNAL OF PLANT DISEASES AND PROTECTION 114(3), 117-119 (2007); and Pasche et al., CROP PROTECTION 27(3-5), 427-435 (2008).

In cereals, the following pathogens show increasing resistance towards Qo inhibitors due to their G143A mutation:

*Septoria tritici* (Leaf blotch) on wheat

*Microduchium nivale*, (Head blight) on wheat

*Blumeria graminis* f. sp. *tritici*, (powdery mildew) on wheat

*Phaesphaeria nodorum*, (Leaf blotch) on wheat

*Pyrenophora tritici-repentis*, (tan spot) on wheat

*Rhynchosporium secalis*, (Leaf blotch) on barley

*Blumeria graminis* f. sp. *hordei* (powdery mildew) on barley

*Ramularia collo-cygni*, (Leaf spot) on barley

A pathogen with resistance towards Qo inhibitors due to their F129L mutation is

*Pyrenophora teres*, (Net blotch) on barley.

Thus, new methods and compositions are desirable for controlling these pathogen induced diseases in crops comprising plants subjected to pathogens that are resistant to Qo inhibitors. Furthermore, in many cases, in particular at low application rates, the fungicidal activity of the known fungicidal strobilurin analogue compounds is unsatisfactory, especially in case that a high proportion of the fungal pathogens contain a mutation in the mitochondrial cytochrome b gene conferring resistance to Qo inhibitors. Based on this, it was also an object of the present invention to provide compounds having improved activity and/or a broader activity spectrum against such resistant phytopathogenic harmful fungi on cereal plants.

"Qo inhibitor," as used herein, includes any substance that is capable of diminishing and/or inhibiting respiration by binding to an ubihydroquinone oxidation center of a cytochrome $bc_1$ complex in mitochondria. The oxidation center is typically located on the outer side of the inner mitochrondrial membrane.

From WO2013/092224, the use of Qo inhibitors is known for combating phytopathogenic fungi that are resistant to Qo inhibitors is generally known. Nevertheless, there is a constant need to find further compounds with even improved action against fungi that are resistant to Qo inhibitors.

The compounds I are not explicitly disclosed in WO2013/092224 and have surprisingly high action against fungi that are resistant to Qo inhibitors.

Thus, the present invention relates to the use of 1-[2-[[1-(4-chlorophenyl)pyrazol-3-yl]oxymethyl]-3-methyl-phenyl]-4-methyl-tetrazol-5-one (compound I) for combating phytopathogenic fungi containing a mutation in the mitochondrial cytochrome b gene conferring resistance to Qo inhibitors on cereals, wherein the mutation is G143A or F129L.

The present invention also relates to the use of a mixture comprising compound I in combination with a second compound II, wherein compound II is selected from 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, metconzole, epoxiconazole, prothioconazole, difenoconazole, propiconazole, bromuconazole, chlorothalonil, folpet, fluxapyroxad, bixafen, fluopyram, benzovindiflupyr, pydiflumetofen, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 3-(difluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, penthiopyrad, isopyrazam, boscalid, metrafenone, fenpropimorph, fenpropidin, spiroxamine, pyraclostrobin, (Z,2E)-5-[1-(2,4-dichlorophenyl)pyrazol-3-yl]-oxy-2-methoxyimino-N,3-dimethyl-pent-3-enamide, (Z,2E)-5-[1-(4-chlorophenyl)pyrazol-3-yl]oxy-2-methoxy-imino-N,3-dimethyl-pent-3-enamide, trifloxystrobin, picoxystrobin, azoxystrobin, mandestrobin, metominostrobin, [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate and cyprodinil.

The present invention also relates to the use of a mixture comprising compound I in combination with two compounds II, wherein compound II is defined above.

The term "cereals" comprises wheat or barley.

These Fungi on wheat or barley containing a mutation in the mitochondrial cytochrome b gene conferring resistance to Qo inhibitors, wherein the mutation is G143A or F129L, are hereinafter referred to as "resistant fungi".

Resistant fungi on wheat or barley in the course of the use of the present invention, wherein the mutation is G143A are

*Septoria tritici* (leaf blotch) on wheat,

*Microduchium nivale*, (head blight) on wheat,

*Blumeria graminis* f. sp. *tritici*, (powdery mildew) on wheat,

*Phaesphaeria nodorum*, (leaf blotch) on wheat,

*Pyrenophora tritici-repentis*, (tan spot) on wheat,

*Rhynchosporium secalis*, (leaf blotch) on barley,

*Blumeria graminis* f. sp. *hordei*, (powdery mildew) on barley and

*Ramularia collo-cygni*, (leaf spot) on barley.

The resistant fungi on wheat or barley in the course of the use of the present invention, wherein the mutation is F129L is *Pyrenophora teres*, (net blotch) on barley.

1-[2-[[1-(4-chlorophenyl)pyrazol-3-yl]oxymethyl]-3-methyl-phenyl]-4-methyl-tetrazol-5-one is herein-below abbreviated as compound I.

Thus, the present invention relates to the use of compound I for combating resistant fungi on cereals, wherein the cereal is wheat, and the resistant fungi is *Septoria tritici.*

Thus, the present invention relates to the use of compound I for combating resistant fungi on cereals, wherein the cereal is wheat, and the resistant fungi is *Microduchium nivale.*

Thus, the present invention relates to the use of compound I for combating resistant fungi on cereals, wherein the cereal is wheat, and the resistant fungi is *Blumeria graminis* f. sp. *tritici.*

Thus, the present invention relates to the use of compound I for combating resistant fungi on cereals, wherein the cereal is wheat, and the resistant fungi is *Phaesphaeria nodorum.*

Thus, the present invention relates to the use of compound I for combating resistant fungi on cereals, wherein the cereal is wheat, and the resistant fungi is *Pyrenophora tritici-repentis.*

Thus, the present invention relates to the use of compound I for combating resistant fungi on cereals, wherein the cereal is barely, and the resistant fungi is *Rhynchosporium secalis.*

Thus, the present invention relates to the use of compound I for combating resistant fungi on cereals, wherein the cereal is barely, and the resistant fungi is *Blumeria graminis* f. sp. *hordei.*

Thus, the present invention relates to the use of compound I for combating resistant fungi on cereals, wherein the cereal is barely, and the resistant fungi is *Pyrenophora teres.*

Thus, the present invention relates to the use of compound I for combating resistant fungi on cereals, wherein the cereal is barely, and the resistant fungi is *Ramularia collo-cygni.*

In a more preferred embodiment, the present invention relates to the use of a compound I for combating resistant fungi on cereals, wherein the resistant fungi is *Septoria tritici.*

In a further more preferred embodiment, the present invention relates to the use of a compound I for combating resistant fungi on cereals, wherein the cereal is barely, and the resistant fungi is *Pyrenophora teres.*

In a further more preferred embodiment, the present invention relates to the use of compound I for combating resistant fungi on cereals, wherein the cereal is barely, and the resistant fungi is *Ramularia collo-cygni.*

Thus, the present invention relates to the use of compound I—for combating resistant fungi on cereals, wherein the cereal is wheat, and the resistant fungi is *Septoria tritici.*

Thus, the present invention relates to the use of compound I—for combating resistant fungi on cereals, wherein the cereal is barley, and the resistant fungi is *Pyrenophora teres.*

Thus, the present invention relates to the use of compound I—for combating resistant fungi on cereals, wherein the cereal is barley, and the resistant fungi is *Ramularia collo-cygni.*

The present invention also relates to the use of a mixture comprising compound I in combination with a second compound II, wherein compound II is selected from 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, metconzole, epoxiconazole, prothioconazole, difenoconazole, propiconazole, bromuconazole, chlorothalonil, folpet, fluxapyroxad, bixafen, fluopyram, benzovindiflupyr, pydiflumetofen, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl) pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 3-(difluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, penthiopyrad, isopyrazam, boscalid, metrafenone, fenpropimorph, fenpropidin, spiroxamine, pyraclostrobin, (Z,2E)-5-[1-(2,4-dichlorophenyl)pyrazol-3-yl]-oxy-2-methoxyimino-N,3-dimethyl-pent-3-enamide, (Z,2E)-5-[1-(4-chlorophenyl)pyrazol-3-yl]oxy-2-methoxyimino-N,3-dimethyl-pent-3-enamide, trifloxystrobin, picoxystrobin, azoxystrobin, mandestrobin, metominostrobin, [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate and cyprodinil for combating resistant fungi on wheat or barley.

In a further preferred embodiment, the present invention relates to the use of any of the mixtures of compound I and compound II as defined above for combating resistant fungi on cereals, wherein the cereal is wheat, and the resistant fungi is *Septoria tritici.*

In a further preferred embodiment, the present invention relates to the use of any of the mixtures of compound I and compound II as defined above for combating resistant fungi on cereals, wherein the cereal is wheat, and the resistant fungi is *Microduchium nivale.*

In a further preferred embodiment, the present invention relates to the use of any of the mixtures of compound I and compound II as defined above for combating resistant fungi on cereals, wherein the cereal is wheat, and the resistant fungi is *Blumeria graminis* f. sp. *tritici.*

In a further preferred embodiment, the present invention relates to the use of any of the mixtures of compound I and compound II as defined above for combating resistant fungi on cereals, wherein the cereal is wheat, and the resistant fungi is *Phaesphaeria nodorum.*

In a further preferred embodiment, the present invention relates to the use of any of the mixtures of compound I and compound II as defined above for combating resistant fungi on cereals, wherein the cereal is wheat, and the resistant fungi is *Pyrenophora tritici-repentis.*

In a further preferred embodiment, the present invention relates to the use of any of the mixtures of compound I and compound II as defined above for combating resistant fungi on cereals, wherein the cereal is barely, and the resistant fungi is *Rhynchosporium secalis.*

In a further preferred embodiment, the present invention relates to the use of any of the mixtures of compound I and compound II as defined above for combating resistant fungi on cereals, wherein the cereal is barely, and the resistant fungi is *Blumeria graminis* f. sp. *hordei.*

In a further preferred embodiment, the present invention relates to the use of any of the mixtures of compound I and compound II as defined above for combating resistant fungi on cereals, wherein the cereal is barely, and the resistant fungi is *Pyrenophora teres.*

In a further preferred embodiment, the present invention relates to the use of any of the mixtures of compound I and compound II as defined above for combating resistant fungi on cereals, wherein the cereal is barely, and the resistant fungi is *Ramularia collo-cygni.*

Thus, the present invention relates to the use of any of the mixtures M-1 to M-195 as defined in Table 1 for combating resistant fungi on cereals, wherein the cereal is wheat, and the resistant fungi is *Septoria tritici.*

TABLE 1

| "I" is compound I, "II" is compound II"No | I | II |
|---|---|---|
| M-1 | I | 2-[4-(4-chlorophenoxy)-2-(trifluoromethyl)phenyl]-1-(1,2,4-triazol-1-yl)propan-2-ol |
| M-2 | I | 2-[4-(4-chlorophenoxy)-2-(trifluoromethyl)phenyl]-3-methyl-1-(1,2,4-triazol-1-yl)butan-2-ol |
| M-3 | I | 1-[4-(4-chlorophenoxy)-2-(trifluoromethyl)phenyl]-1-cyclopropyl-2-(1,2,4-triazol-1-yl) ethanol |
| M-4 | I | metconzole |
| M-5 | I | epoxiconazole |
| M-6 | I | prothioconazole |
| M-7 | I | difenoconazole |
| M-8 | I | propiconazole |
| M-9 | I | bromuconazole |
| M-10 | I | chlorothalonil |
| M-11 | I | folpet |
| M-12 | I | fluxapyroxad |
| M-13 | I | bixafen |
| M-14 | I | fluopyram |
| M-15 | I | benzovindiflupyr |
| M-16 | I | pydiflumetofen |
| M-17 | I | 3-(difluoromethyl)-1-methyl-N-(1,1,3-trimethylindan-4-yl)pyrazole-4-carboxamide |
| M-18 | I | 3-(trifluoromethyl)-1-methyl-N-(1,1,3-trimethylindan-4-yl)pyrazole-4-carboxamide |
| M-19 | I | 1,3-dimethyl-N-(1,1,3-trimethylindan-4-yl)pyrazole-4-carboxamide |
| M-20 | I | 3-(trifluoromethyl)-1,5-dimethyl-N-(1,1,3-trimethylindan-4-yl)pyrazole-4-carboxamide |
| M-21 | I | 3-(difluoromethyl)-1,5-dimethyl-N-(1,1,3-trimethylindan-4-yl)pyrazole-4-carboxamide |
| M-22 | I | 1,3,5-trimethyl-N-(1,1,3-trimethylindan-4-yl)pyrazole-4-carboxamide |
| M-23 | I | penthiopyrad |
| M-24 | I | isopyrazam |
| M-25 | I | boscalid |
| M-26 | I | metrafenone |
| M-27 | I | fenpropimorph |
| M-28 | I | fenpropidin |
| M-29 | I | spiroxamine |
| M-30 | I | pyraclostrobin |
| M-31 | I | (Z,2E)-5-[1-(2,4-dichlorophenyl)pyrazol-3-yl]¬oxy-2-methoxyimino-N,3-dimethyl-pent-3-enamide |
| M-32 | I | (Z,2E)-5-[1-(4-chlorophenyl)pyrazol-3-yl]oxy-2-methoxyimino-N,3-dimethyl-pent-3-enamide |
| M-33 | I | trifloxystrobin |
| M-34 | I | picoxystrobin |
| M-35 | I | azoxystrobin |
| M-36 | I | mandestrobin |
| M-37 | I | metominostrobin |
| M-38 | I | [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate |
| M-39 | I | cyprodinil |

Thus, the present invention relates to the use of any of the mixtures M-1 to M-39 as defined in Table 1 for combating resistant fungi on cereals, wherein the cereal is wheat, and the resistant fungi is *Microduchium nivale.*

Thus, the present invention relates to the use of any of the mixtures M-1 to M-39 as defined in Table 1 for combating resistant fungi on cereals, wherein the cereal is wheat, and the resistant fungi is *Blumeria graminis* f. sp. *tritici.*

Thus, the present invention relates to the use of any of the mixtures M-1 to M-39 as defined in Table 1 for combating resistant fungi on cereals, wherein the cereal is wheat, and the resistant fungi is *Phaesphaeria nodorum.*

Thus, the present invention relates to the use of any of the mixtures M-1 to M-39 as defined in Table 1 for combating resistant fungi on cereals, wherein the cereal is wheat, and the resistant fungi is *Pyrenophora tritici-repentis.*

Thus, the present invention relates to the use of any of the mixtures M-1 to M-39 as defined in Table 1 for combating resistant fungi on cereals, wherein the cereal is barely, and the resistant fungi is *Rhynchosporium secalis.*

Thus, the present invention relates to the use of any of the mixtures M-1 to M-39 as defined in Table 1 for combating resistant fungi on cereals, wherein the cereal is barely, and the resistant fungi is *Blumeria graminis* f. sp. *hordei.*

Thus, the present invention relates to the use of any of the mixtures M-1 to M-39 as defined in Table 1 for combating resistant fungi on cereals, wherein the cereal is barely, and the resistant fungi is *Pyrenophora teres.*

Thus, the present invention relates to the use of any of the mixtures M-1 to M-39 as defined in Table 1 for combating resistant fungi on cereals, wherein the cereal is barely, and the resistant fungi is *Ramularia collo-cygni.*

In a more preferred embodiment, the present invention relates to the use of any of the mixtures of compound I and compound II as defined above for combating resistant fungi on cereals, wherein the cereal is wheat, and the resistant fungi is *Septoria tritici.*

In a further more preferred embodiment, the present invention relates to the use of any of the mixtures of compound I and compound II as defined above for combating resistant fungi on cereals, wherein the cereal is barely, and the resistant fungi is *Pyrenophora teres.*

In a further more preferred embodiment, the present invention relates to the use of compound I—for combating resistant fungi on cereals, wherein the cereal is barley, and the resistant fungi is *Ramularia collo-cygni.*

Thus, the present invention relates to the use of any of the mixtures M-1 to M-195 as defined in Table 1 for combating resistant fungi on cereals, wherein the cereal is wheat, and the resistant fungi is *Septoria tritici.*

Thus, the present invention relates to the use of any of the mixtures M-1 to M-195 as defined in Table 1 for combating resistant fungi on cereals, wherein the cereal is barley, and the resistant fungi is *Pyrenophora teres.*

Thus, the present invention relates to the use of any of the mixtures M-1 to M-195 as defined in Table 1 for combating resistant fungi on cereals, wherein the cereal is barley, and the resistant fungi is *Ramularia collo-cygni.*

In a most preferred embodiment, the present invention relates to the use of any of the mixtures of compound I and compound II for combating resistant fungi on cereals, wherein compound II is selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, prothioconazole, fluxapyroxad, metrafenone, pyraclostrobin and azoxystrobin, wherein the cereal is wheat, and the resistant fungi is *Septoria tritici.*

In a further most preferred embodiment, the present invention relates to the use of any of the mixtures of compound I and compound II for combating resistant fungi on cereals, wherein compound II is selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, prothioconazole, fluxapyroxad, metrafenone, pyraclostrobin and azoxystrobin, wherein Y is Y1 and wherein the cereal is barely, and the resistant fungi is *Pyrenophora teres.*

In a further most preferred embodiment, the present invention relates to the use of any of the mixtures of compound I and compound II for combating resistant fungi on cereals, wherein compound II is selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, prothioconazole, fluxapyroxad, metrafenone, pyraclostrobin and azoxystrobin, wherein Y is Y1 and wherein the cereal is barely, and the resistant fungi is *Ramularia collo-cygni.*

Thus, the present invention relates to the use of any of the mixtures MB-1 to MB-40 as defined in Table 2 for combating resistant fungi on cereals, wherein the cereal is wheat, and the resistant fungi is *Septoria tritici.*

TABLE 2

"I" is compound I, "II" is compound II"

| No | I | II |
|---|---|---|
| MB-1 | I | 2-[4-(4-chlorophenoxy)-2-(trifluoromethyl)phenyl]-1-(1,2,4-triazol-1-yl)propan-2-ol |
| MB-2 | I | 2-[4-(4-chlorophenoxy)-2-(trifluoromethyl)phenyl]-3-methyl-1-(1,2,4-triazol-1-yl)butan-2-ol |
| MB-3 | I | 1-[4-(4-chlorophenoxy)-2-(trifluoromethyl)phenyl]-1-cyclopropyl-2-(1,2,4-triazol-1-yl)ethanol |
| MB-4 | I | prothioconazole |
| MB-5 | I | fluxapyroxad |
| MB-6 | I | metrafenone |
| MB-7 | I | pyraclostrobin |
| MB-8 | I | azoxystrobin |

Thus, the present invention relates to the use of any of the mixtures MB-1 to MB-8 as defined in Table 2 for combating resistant fungi on cereals, wherein the cereal is barley, and the resistant fungi is *Pyrenophora teres.*

Thus, the present invention relates to the use of any of the mixtures MB-1 to MB-8 as defined in Table 2 for combating resistant fungi on cereals, wherein the cereal is barley, and the resistant fungi is *Ramularia collo-cygni.*

The present invention also relates to the use of a mixture comprising compound I in combination with two compounds II selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, metconzole, epoxiconazole, prothioconazole, difenoconazole, propiconazole, bromuconazole, chlorothalonil, folpet, fluxapyroxad, bixafen, fluopyram, benzovindiflupyr, pydiflumetofen, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 3-(difluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, penthiopyrad, isopyrazam, boscalid, metrafenone, fenpropimorph, fenpropidin, spiroxamine, pyraclostrobin, (Z,2E)-5-[1-(2,4-dichlorophenyl)pyrazol-3-yl]-oxy-2-methoxyimino-N,3-dimethyl-pent-3-enamide, (Z,2E)-5-[1-(4-chlorophenyl)pyrazol-3-yl]oxy-2-methoxyimino-N,3-dimethyl-pent-3-enamide, trifloxystrobin, picoxystrobin, azoxystrobin, mandestrobin, metominostrobin, [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate and cyprodinil for combating resistant fungi on cereals.

Thus, the present invention relates to the use of any of the mixtures M4A-1 to M4A-69 as defined in Table 4A to combat resistant fungi on cereals, wherein the cereal is wheat, and the resistant fungi is *Septoria tritici*.

TABLE 4A

"I" is compound I, "II" is compound II"

| No | I | II | II (2) |
|---|---|---|---|
| M4A-1 | I | 2-[4-(4-chlorophenoxy)-2-(trifluoromethyl)phenyl]-1-(1,2,4-triazol-1-yl)propan-2-ol | fluxapyroxad |
| M4A-2 | I | 2-[4-(4-chlorophenoxy)-2-(trifluoromethyl)phenyl]-1-(1,2,4-triazol-1-yl)propan-2-ol | metrafenone |
| M4A-3 | I | 2-[4-(4-chlorophenoxy)-2-(trifluoromethyl)phenyl]-1-(1,2,4-triazol-1-yl)propan-2-ol | azoxystrobin |
| M4A-4 | I | 2-[4-(4-chlorophenoxy)-2-(trifluoromethyl)phenyl]-1-(1,2,4-triazol-1-yl)propan-2-ol | pyraclostrobin |
| M4A-5 | I | 2-[4-(4-chlorophenoxy)-2-(trifluoromethyl)phenyl]-3-methyl-1-(1,2,4-triazol-1-yl)butan-2-ol | fluxapyroxad |
| M4A-6 | I | 2-[4-(4-chlorophenoxy)-2-(trifluoromethyl)phenyl]-3-methyl-1-(1,2,4-triazol-1-yl)butan-2-ol | metrafenone |
| M4A-7 | I | 2-[4-(4-chlorophenoxy)-2-(trifluoromethyl)phenyl]-3-methyl-1-(1,2,4-triazol-1-yl)butan-2-ol | azoxystrobin |
| M4A-8 | I | 2-[4-(4-chlorophenoxy)-2-(trifluoromethyl)phenyl]-3-methyl-1-(1,2,4-triazol-1-yl)butan-2-ol | pyraclostrobin |
| M4A-9 | I | 1-[4-(4-chlorophenoxy)-2-(trifluoromethyl)phenyl]-1-cyclopropyl-2-(1,2,4-triazol-1-yl)ethanol | fluxapyroxad |
| M4A-10 | I | 1-[4-(4-chlorophenoxy)-2-(trifluoromethyl)phenyl]-1-cyclopropyl-2-(1,2,4-triazol-1-yl)ethanol | metrafenone |
| M4A-11 | I | 1-[4-(4-chlorophenoxy)-2-(trifluoromethyl)phenyl]-1-cyclopropyl-2-(1,2,4-triazol-1-yl)ethanol | azoxystrobin |
| M4A-12 | I | 1-[4-(4-chlorophenoxy)-2-(trifluoromethyl)phenyl]-1-cyclopropyl-2-(1,2,4-triazol-1-yl)ethanol | pyraclostrobin |
| M4A-13 | I | fluxapyroxad | metrafenone |
| M4A-14 | I | fluxapyroxad | azoxystrobin |
| M4A-15 | I | fluxapyroxad | pyraclostrobin |
| M4A-16 | I | metrafenone | azoxystrobin |
| M4A-17 | I | metrafenone | pyraclostrobin |
| M4A-18 | I | 2-[4-(4-chlorophenoxy)-2-(trifluoromethyl)phenyl]-1-(1,2,4-triazol-1-yl)propan-2-ol | bixafen |
| M4A-19 | I | 2-[4-(4-chlorophenoxy)-2-(trifluoromethyl)phenyl]-1-(1,2,4-triazol-1-yl)propan-2-ol | benzovindiflupyr |
| M4A-20 | I | 2-[4-(4-chlorophenoxy)-2-(trifluoromethyl)phenyl]-1-(1,2,4-triazol-1-yl)propan-2-ol | pydiflumetofen |
| M4A-21 | I | 2-[4-(4-chlorophenoxy)-2-(trifluoromethyl)phenyl]-1-(1,2,4-triazol-1-yl)propan-2-ol | (Z,2E)-5-[1-(2,4-dichlorophenyl)pyrazol-3-yl]¬oxy-2-methoxyimino-N,3-dimethyl-pent-3-enamide |
| M4A-22 | I | 2-[4-(4-chlorophenoxy)-2-(trifluoromethyl)phenyl]-1-(1,2,4-triazol-1-yl)propan-2-ol | (Z,2E)-5-[1-(4-chlorophenyl)pyrazol-3-yl]oxy-2-methoxyimino-N,3-dimethyl-pent-3-enamide |

TABLE 4A-continued

"I" is compound I, "II" is compound II"

| No | I | II | II (2) |
|---|---|---|---|
| M4A-23 | I | 2-[4-(4-chlorophenoxy)-2-(trifluoromethyl)phenyl]-1-(1,2,4-triazol-1-yl)propan-2-ol | [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate |
| M4A-24 | I | 2-[4-(4-chlorophenoxy)-2-(trifluoromethyl)phenyl]-1-(1,2,4-triazol-1-yl)propan-2-ol | cyprodinil |
| M4A-25 | I | 2-[4-(4-chlorophenoxy)-2-(trifluoromethyl)phenyl]-3-methyl-1-(1,2,4-triazol-1-yl)butan-2-ol | bixafen |
| M4A-26 | I | 2-[4-(4-chlorophenoxy)-2-(trifluoromethyl)phenyl]-3-methyl-1-(1,2,4-triazol-1-yl)butan-2-ol | benzovindiflupyr |
| M4A-27 | I | 2-[4-(4-chlorophenoxy)-2-(trifluoromethyl)phenyl]-3-methyl-1-(1,2,4-triazol-1-yl)butan-2-ol | pydiflumetofen |
| M4A-28 | I | 2-[4-(4-chlorophenoxy)-2-(trifluoromethyl)phenyl]-3-methyl-1-(1,2,4-triazol-1-yl)butan-2-ol | (Z,2E)-5-[1-(2,4-dichlorophenyl)pyrazol-3-yl]¬oxy-2-methoxyimino-N,3-dimethyl-pent-3-enamide |
| M4A-29 | I | 2-[4-(4-chlorophenoxy)-2-(trifluoromethyl)phenyl]-3-methyl-1-(1,2,4-triazol-1-yl)butan-2-ol | (Z,2E)-5-[1-(4-chlorophenyl)pyrazol-3-yl]oxy-2-methoxyimino-N,3-dimethyl-pent-3-enamide |
| M4A-30 | I | 2-[4-(4-chlorophenoxy)-2-(trifluoromethyl)phenyl]-3-methyl-1-(1,2,4-triazol-1-yl)butan-2-ol | [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate |
| M4A-31 | I | 2-[4-(4-chlorophenoxy)-2-(trifluoromethyl)phenyl]-3-methyl-1-(1,2,4-triazol-1-yl)butan-2-ol | cyprodinil |
| M4A-32 | I | 1-[4-(4-chlorophenoxy)-2-(trifluoromethyl)phenyl]-1-cyclopropyl-2-(1,2,4-triazol-1-yl)ethanol | bixafen |
| M4A-33 | I | 1-[4-(4-chlorophenoxy)-2-(trifluoromethyl)phenyl]-1-cyclopropyl-2-(1,2,4-triazol-1-yl)ethanol | benzovindiflupyr |
| M4A-34 | I | 1-[4-(4-chlorophenoxy)-2-(trifluoromethyl)phenyl]-1-cyclopropyl-2-(1,2,4-triazol-1-yl)ethanol | pydiflumetofen |
| M4A-35 | I | 1-[4-(4-chlorophenoxy)-2-(trifluoromethyl)phenyl]-1-cyclopropyl-2-(1,2,4-triazol-1-yl)ethanol | (Z,2E)-5-[1-(2,4-dichlorophenyl)pyrazol-3-yl]¬oxy-2-methoxyimino-N,3-dimethyl-pent-3-enamide |
| M4A-36 | I | 1-[4-(4-chlorophenoxy)-2-(trifluoromethyl)phenyl]-1-cyclopropyl-2-(1,2,4-triazol-1-yl)ethanol | (Z,2E)-5-[1-(4-chlorophenyl)pyrazol-3-yl]oxy-2-methoxyimino-N,3-dimethyl-pent-3-enamide |

TABLE 4A-continued

| "I" is compound I, "II" is compound II" | | | |
|---|---|---|---|
| No | I | II | II (2) |
| M4A-37 | I | 1-[4-(4-chlorophenoxy)-2-(trifluoromethyl)phenyl]-1-cyclopropyl-2-(1,2,4-triazol-1-yl)ethanol | [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate |
| M4A-38 | I | 1-[4-(4-chlorophenoxy)-2-(trifluoromethyl)phenyl]-1-cyclopropyl-2-(1,2,4-triazol-1-yl)ethanol | cyprodinil |
| M4A-39 | I | fluxapyroxad | difenoconazole |
| M4A-40 | I | fluxapyroxad | propiconazole |
| M4A-41 | I | fluxapyroxad | bromuconazole |
| M4A-42 | I | fluxapyroxad | chlorothalonil |
| M4A-43 | I | fluxapyroxad | bixafen |
| M4A-44 | I | fluxapyroxad | benzovindiflupyr |
| M4A-45 | I | fluxapyroxad | pydiflumetofen |
| M4A-46 | I | (Z,2E)-5-[1-(2,4-dichlorophenyl)pyrazol-3-yl]¬oxy-2-methoxyimino-N,3-dimethyl-pent-3-enamide | Fluxapyroxad |
| M4A-47 | I | (Z,2E)-5-[1-(4-chlorophenyl)pyrazol-3-yl]oxy-2-methoxyimino-N,3-dimethyl-pent-3-enamide | Fluxapyroxad |
| M4A-48 | I | [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate | fluxapyroxad |
| M4A-49 | I | fluxapyroxad | cyprodinil |
| M4A-50 | I | metrafenone | difenoconazole |
| M4A-51 | I | metrafenone | propiconazole |
| M4A-52 | I | metrafenone | bromuconazole |
| M4A-53 | I | metrafenone | chlorothalonil |
| M4A-54 | I | metrafenone | bixafen |
| M4A-55 | I | metrafenone | benzovindiflupyr |
| M4A-56 | I | metrafenone | pydiflumetofen |
| M4A-57 | I | (Z,2E)-5-[1-(2,4-dichlorophenyl)pyrazol-3-yl]¬oxy-2-methoxyimino-N,3-dimethyl-pent-3-enamide | metrafenone |
| M4A-58 | I | (Z,2E)-5-[1-(4-chlorophenyl)pyrazol-3-yl]oxy-2-methoxyimino-N,3-dimethyl-pent-3-enamide | metrafenone |
| M4A-59 | I | [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate | metrafenone |
| M4A-60 | I | metrafenone | cyprodinil |
| M4A-61 | I | azoxystrobin | difenoconazole |
| M4A-62 | I | azoxystrobin | propiconazole |
| M4A-63 | I | azoxystrobin | bromuconazole |
| M4A-64 | I | azoxystrobin | chlorothalonil |
| M4A-65 | I | azoxystrobin | bixafen |
| M4A-66 | I | azoxystrobin | benzovindiflupyr |
| M4A-67 | I | azoxystrobin | pydiflumetofen |
| M4A-68 | I | [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate | azoxystrobin |
| M4A-69 | I | azoxystrobin | cyprodinil |

Thus, the present invention relates to the use of any of the mixtures M4A-1 to M4A-69 as defined in Table 4A for combating resistant fungi on cereals, wherein the cereal is wheat, and the resistant fungi is *Microduchium nivale.*

Thus, the present invention relates to the use of any of the mixtures M4A-1 to M4A-69 as defined in Table 4A for combating resistant fungi on cereals, wherein the cereal is wheat, and the resistant fungi is *Blumeria graminis* f. sp. *tritici.*

Thus, the present invention relates to the use of any of the mixtures M4A-1 to M4A-69 as defined in Table 4A for combating resistant fungi on cereals, wherein the cereal is wheat, and the resistant fungi is *Phaesphaeria nodorum.*

Thus, the present invention relates to the use of any of the mixtures M4A-1 to M4A-69 as defined in Table 4A for combating resistant fungi on cereals, wherein the cereal is wheat, and the resistant fungi is *Pyrenophora tritici-repentis.*

Thus, the present invention relates to the use of any of the mixtures M4A-1 to M4A-69 as defined in Table 4A for combating resistant fungi on cereals, wherein the cereal is barely, and the resistant fungi is *Rhynchosporium secalis.*

Thus, the present invention relates to the use of any of the mixtures M4A-1 to M4A-69 as defined in Table 4A for combating resistant fungi on cereals, wherein the cereal is barely, and the resistant fungi is *Blumeria graminis* f. sp. *hordei.*

Thus, the present invention relates to the use of any of the mixtures M4A-1 to M4A-69 as defined in Table 4A for combating resistant fungi on cereals, wherein the cereal is barely, and the resistant fungi is *Pyrenophora teres.*

Thus, the present invention relates to the use of any of the mixtures M4A-1 to M4A-69 as defined in Table 4A for combating resistant fungi on cereals, wherein the cereal is barely, and the resistant fungi is *Ramularia collo-cygni.*

All above-referred mixtures are herein blow abbreviated as inventive mixtures.

The term "use of compound I or any of the inventive mixtures for combating resistant fungi on cereals" comprises a method for controlling resistant fungi on cereals, wherein the fungi, their habitat, breeding grounds, their locus or the plants to be protected against such fungal attack, the soil or plant propagation material (preferably seed) are treated with an pesticidally effective amount of a compound I as defined above or a mixture of compound I with one or two compounds II.

Preferably, such method for controlling resistant fungi on cereals comprises treating the resistant fungi, their habitat, breeding grounds, their locus or the plants to be protected against pest attack with an pesticidally effective amount of a compound I as defined above or a mixture of compound I with one or two compounds II.

The term "effective amount" means that compound I or the inventive mixtures are used in a quantity which allows obtaining the desired effect which is a synergistic control of resistant fungi, but which does not give rise to any phytotoxic symptom on the treated plant.

If the compound I is applied with one or two compounds II, such application can be made simultaneous that is jointly or separately, or in succession.

The ratio by weight of compound I and compound II in binary inventive mixtures is from 20000:1 to 1:20000, from 500:1 to 1:500, preferably from 100:1 to 1:100 more preferably from 50:1 to 1:50, most preferably from 20:1 to 1:20, and utmost preferably ratios from 10:1 to 1:10, which also includes ratios of 1:5 to 5:1, 1:1.

The ratio by weight of compound I, II and second compound II in each combination of two ingredients in the mixture of three ingredients is from 20000:1 to 1:20000, from 500:1 to 1:500, preferably from 100:1 to 1:100 more preferably from 50:1 to 1:50, most preferably from 20:1 to 1:20, and utmost preferably ratios from 10:1 to 1:10 including also ratios from 1:5 to 5:1, or 1:1.

Compound I or the inventive mixtures can be accompanied by further pesticides, e.g. one or more insecticides, fungicides, herbicides.

The compound I or the inventive mixtures can be converted into customary types of agrochemical compositions, e. g. solutions, emulsions, suspensions, dusts, powders, pastes, granules, pressings, capsules, dispersions, and mixtures thereof. Examples for composition types are suspensions (e.g. SC, OD, FS), emulsifiable concentrates (e.g. EC), emulsions (e.g. EW, EO, ES, ME), dispersible concentrates (DC), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B—C type comprising alkanol, polyethylene oxide and polypropylene oxide.

Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglegtable or even no pesticidal activity themselves, and which improve the biological performance of the compound I or the inventive mixtures on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:

i) Water-Soluble Concentrates (SL, LS)

10-60 wt % of a compound I or the inventive mixture and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible Concentrates (DC)

5-25 wt % of a compound I or the inventive mixture and 1-10 wt % dispersant (e. g. polyvinylpyrrolidone) are dissolved in organic solvent (e.g. cyclohexanone) ad 100 wt %. Dilution with water gives a dispersion.

iii) Emulsifiable Concentrates (EC)

15-70 wt % of a compound I or the inventive mixture and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)

5-40 wt % of a compound I or the inventive mixture and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of a compound I or the inventive mixture are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type composition up to 40 wt % binder (e.g. polyvinylalcohol) is added.

vi) Water-Dispersible Granules and Water-Soluble Granules (WG, SG)

50-80 wt % of a compound I or the inventive mixture are ground finely with addition of dispersants and wetting agents (e.g. sodium lignosulfonate and alcohol ethoxylate) ad 100 wt % and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of a compound I or the inventive mixture are ground in a rotor-stator mill with addition of 1-5 wt % dispersants (e.g. sodium lignosulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)

In an agitated ball mill, 5-25 wt % of a compound I or the inventive mixture are comminuted with addition of 3-10 wt % dispersants (e.g. sodium lignosulfonate), 1-5 wt % thickener (e.g. carboxymethylcellulose) and water ad 100 wt % to give a fine suspension of the active substance. Dilution with water gives a stable suspension of the active substance.

iX) Microemulsion (ME)

5-20 wt % of a compound I or the inventive mixture are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamically stable microemulsion.

x) Microcapsules (CS)

An oil phase comprising 5-50 wt % of a compound I or the inventive mixture, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a compound I or the inventive mixture according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS composition.

xi) Dustable Powders (DP, DS)

1-10 wt % of a compound I or the inventive mixture are ground finely and mixed intimately with solid carrier (e.g. finely divided kaolin) ad 100 wt %.

xii) Granules (GR, FG)

0.5-30 wt % of a compound I or the inventive mixture is ground finely and associated with solid carrier (e.g. silicate) ad 100 wt %. Granulation is achieved by extrusion, spray-drying or fluidized bed.

xiii) Ultra-Low Volume Liquids (UL)

1-50 wt % of a compound I or the inventive mixture are dissolved in organic solvent (e.g. aromatic hydrocarbon) ad 100 wt %.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The resulting agrochemical compositions generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40%, in the ready-to-use preparations. Application can be carried out before or during sowing. Methods for applying the compound I or the inventive mixtures and compositions thereof, respectively, on to plant propagation material, especially seeds include dressing, coating, pelleting, dusting, soaking and in-furrow application methods of the propagation material. Preferably, the compound I or the inventive mixtures or the compositions thereof, respectively, are applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.01 to 1.0 kg per ha, and in particular from 0.05 to 0.75 kg per ha.

In treatment of plant propagation materials such as seeds, e. g. by dusting, coating or drenching seed, amounts of active substance of from 0.01-10 kg, preferably from 0.1-1000 g, more preferably from 1-100 g per 100 kilogram of plant propagation material (preferably seeds) are generally required.

Various types of oils, wetters, adjuvants, fertilizer, or micronutrients, and further pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank or any other kind of vessel used for applications (e. g. seed treater drums, seed pelleting machinery, knapsack sprayer) and further auxiliaries may be added, if appropriate.

Consequently, one embodiment of the invention is a kit for preparing a usable pesticidal composition, the kit comprising a) a composition comprising component 1) as defined herein and at least one auxiliary; and b) a composition comprising component 2) as defined herein and at least one auxiliary; and optionally c) a composition comprising at least one auxiliary and optionally one or two further active components II as defined herein above.

The invention is further illustrated, but not limited by the examples set forth below:

EXAMPLES

Example 1: Activity of Compound I

Compound I according to the present invention is formulated separately as a stock solution having a concentration of 10000 ppm in dimethyl sulfoxide.

1A. Activity Against Leaf Blotch on Wheat Caused by *Septoria tritici*

The stock solution of compound I according to the present invention was mixed according to the ratio, pipetted onto a micro titer plate and diluted with water to the stated concentrations. A spore suspension of a sensitive and a $Q_O$I resistant isolate of *Septoria tritici* in an aqueous biomalt or yeast-bactopeptone-glycerine solution was then added. The plates were placed in a water vapor-saturated chamber at a temperature of 18° C. Using an absorption photometer, the MTPs were measured at 405 nm 7 days after the inoculation. The results are shown in Table 1.

TABLE 1

| Compound | Conc. (ppm) | Growth (%) sensitive isolate of *Septoria tritici* | Growth (%) QOI resistant isolate of *Septoria tritici* |
|---|---|---|---|
| compound I of the present invention | 63 | 0 | 3 |

1 B. Activity Against Net Blotch *Pyrenophora teres* in the Microtiter Test

The stock solution of compound I according to the present invention was mixed according to the ratio, pipetted onto a micro titer plate (MTP) and diluted with water to the stated concentrations. A spore suspension of a sensitive and a $Q_O$I resistant isolate of *Pyrenophora teres* in an aqueous biomalt or yeast-bactopeptone-glycerine solution was then added. The plates were placed in a water vapor-saturated chamber at a temperature of 18° C. Using an absorption photometer, the MTPs were measured at 405 nm 7 days after the inoculation. The results are shown in Table 2

TABLE 2

| Compound | Conc. (ppm) | Growth (%) sensitive isolate of *Pyrenophora teres.* | Growth (%) QOI resistant isolate of *Pyrenophora teres* |
|---|---|---|---|
| compound I of the present invention | 63 | 6 | 6 |

Example 2 Comparative Example

Compound I according to the present invention and compound 1-213 from prior art (WO2013/092224) were formulated separately as a stock solution having a concentration of 10000 ppm in dimethyl sulfoxide. The stock solutions of compound I according to the present invention and compound 1-213 from prior art (WO2013/092224) were mixed according to the ratio, pipetted onto a micro titer plate and diluted with water to the stated concentrations. A spore suspension of a sensitive and a $Q_O$I resistant isolate of *Septoria tritici* in an aqueous biomalt or yeast-bactopeptone-glycerine solution was then added. The plates were placed in a water vapor-saturated chamber at a temperature of 18° C. Using an absorption photometer, the MTPs were measured at 405 nm 7 days after the inoculation. The results are shown in Table 3.

TABLE 3

| Compound | Conc. (ppm) | Growth (%) sensitive isolate of *Septoria tritici* | Growth (%) QOI resistant isolate of *Septoria tritici* |
|---|---|---|---|
| compound I-213 (WO13/092224) | 63 | 44 | 60 |
| compound I of the present invention | 63 | 0 | 3 |

The comparison of compound I according to the present invention with compound 1-213 from prior art (WO2013/092224) show the unexpected superior activity of compound I (1-[2-[[1-(4-chlorophenyl)pyrazol-3-yl]oxymethyl]-3-methyl-phenyl]-4-methyl-tetrazol-5-one).

The invention claimed is:

1. A method for combating phytopathogenic fungi on cereals, wherein the fungi, their habitat, breeding grounds, their locus or plants to be protected against fungal attack, the soil or plant propagation material are treated with an effective amount of a 1-[2-[[1-(4-chlorophenyl)pyrazol-3-yl]oxymethyl]-3-methyl-phenyl]-4-methyl-tetrazol-5-one (compound I), such fungi containing a mutation in the mitochondrial cytochrome b gene conferring resistance to Qo inhibitors, wherein the mutation is G143A or F129L.

2. The method of claim 1, wherein the plant is a cereal plant and wherein the cereal plant is wheat.

3. The method of claim 1, wherein the plant is a cereal plant and wherein the cereal plant is barley.

4. The method of claim 1, wherein the phytopathogenic fungi are selected from the group consisting of *Microduchium nivale, Blumeria graminis* f. sp. *tritici, Septoria tritici, Phaesphaeria nodorum* and *Pyrenophora tritici-repentis,* wherein the plant is a cultivated plant and wherein the cultivated plant is wheat.

5. The method claim 4, wherein the phytopathogenic fungus is *Septoria tritici.*

6. The method of claim 1, wherein the phytopathogenic fungus is *Blumeria graminis* f. sp. *hordei, Pyrenophora teres, Ramularia collo-cygni* or *Rhynchosporium secalis*, wherein the plant is a cultivated plant and wherein the cultivated plant is barley.

7. The method of claim 6, wherein the phytopathogenic fungus is *Rhynchosporium secalis.*

8. The method of claim 6, wherein the phytopathogenic fungus is *Pyrenophora teres.*

9. The method of claim 1, wherein compound I as defined claim 1 is applied in the form of a mixture with second compound II, which is selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, metconzole, epoxiconazole, prothioconazole, difenoconazole, propiconazole, bromuconazole, chlorothalonil, folpet, fluxapyroxad, bixafen, fluopyram, benzovindiflupyr, pydiflumetofen, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 3-(difluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, penthiopyrad, isopyrazam, boscalid, metrafenone, fenpropimorph, fenpropidin, spiroxamine, pyraclostrobin, (Z,2E)-5-[1-(2,4-dichlorophenyl)pyrazol-3-yl]oxy-2-methoxyimino-N,3-dimethyl-pent-3-enamide, (Z,2E)-5-[1-(4-chlorophenyl)pyrazol-3-yl]oxy-2-methoxyimino-N,3-dimethyl-pent-3-enamide, trifloxystrobin, picoxystrobin, azoxystrobin, mandestrobin, metominostrobin, [2-[[(7R,8R,9s)-7-benzyl-9-methyl-8-(2-methylpropanoyloxy)-2,6-dioxo-1,5-dioxonan-3-yl]carbamoyl]-4-methoxy-3-pyridyl]oxymethyl 2-methylpropanoate and cyprodinil.

10. The method of claim 9, wherein the ratio by weight of compound I and second compound II is 500:1 to 1:500.

11. The method of claim 10, wherein the plant is a cereal plant and wherein the cereal plant is wheat.

12. The method of claim 10, wherein the plant is a cereal plant and wherein the cereal plant is barley.

13. The method of claim 10, wherein the phytopathogenic fungi are selected from the group consisting of *Microduchium nivale, Blumeria graminis* f. sp. *tritici, Septoria tritici, Phaesphaeria nodorum* and *Pyrenophora tritici-repentis,* wherein the plant is a cultivated plant and wherein the cultivated plant is wheat.

14. The method claim 13, wherein the phytopathogenic fungus is *Septoria tritici.*

15. The method of claim 10, wherein the phytopathogenic fungus is *Blumeria graminis* f sp. *hordei, Pyrenophora teres, Ramularia collo-cygni* or *Rhynchosporium secalis*, wherein the plant is a cultivated plant and wherein the cultivated plant is barley.

16. The method of claim 15, wherein the phytopathogenic fungus is *Rhynchosporium secalis.*

17. The method of claim 15, wherein the phytopathogenic fungus is *Pyrenophora teres.*

18. The method of claim 1, wherein:

the mutation is G143A; and the phytopathogenic fungi are selected from the group consisting of *Septoria tritici, Microduchium nivale, Blumeria graminis* f. sp. *tritici, Phaesphaeria nodorum, Pyrenophora tritici-repentis, Rhynchosporium secalis, Blumeria graminis* f. sp. *hordei*, and *Ramularia collo-cygni.*

19. The method of claim 1, wherein:

the mutation is F129L; and the phytopathogenic fungus is *Pyrenophora teres.*

* * * * *